Patented Oct. 19, 1948

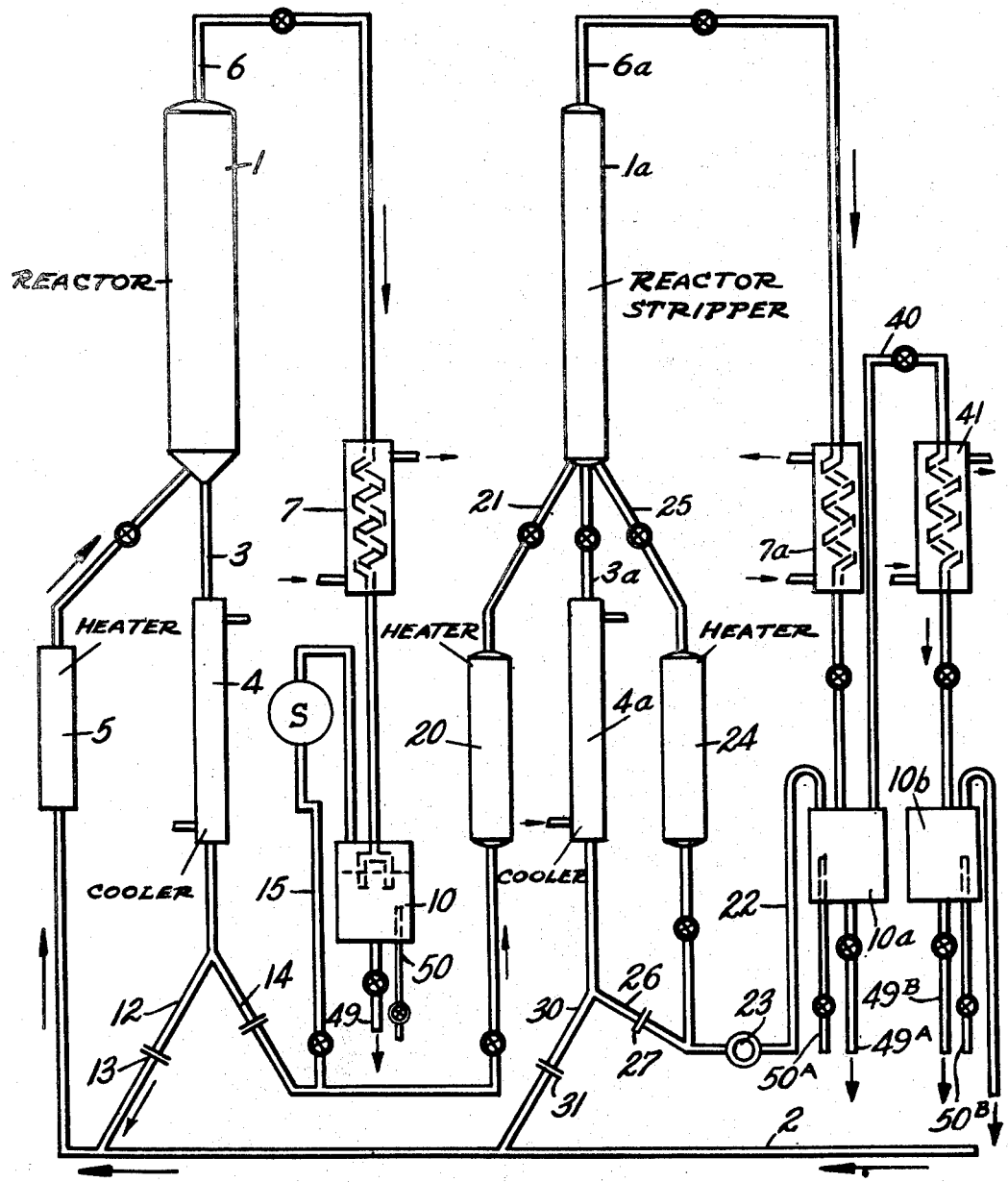

2,451,879

UNITED STATES PATENT OFFICE 2,451,879

HYDROCARBON SYNTHESIS

Walter G. Scharmann, Westfield, N. J., assignor to Standard Oil Development Company, a corporation of Delaware Application April 25, 1945, Serial No. 590,219

6 Claims. (Cl. 260—449.6)

My present invention is fully disclosed in the following specification and claims read in connection with the accompanying drawing.

It is a main object of my present invention to effect the synthesis of hydrocarbons from carbon monoxide and hydrogen in the presence of a fluidized catalyst under operating conditions and employed means directed toward effecting increased efficiency.

It is a specific object of this invention to maintain a fluidized mass of catalyst in a high state of activity and as an aid thereto removing waxy and oily material therefrom either continuously or intermittently.

In the accompanying drawing, I have shown diagrammatically an apparatus layout in which a preferred modification of my invention may be carried into effect.

In the synthesis of hydrocarbons from carbon monoxide and hydrogen performed in the presence of a fluidized mass of catalyst, it is necessary to limit the amount of wax or liquid oil carried on the catalyst to a value below that at which the fluidizing characteristics of the catalyst become adversely affected. To accomplish this result a portion of the catalyst is withdrawn continuously from the reaction zone, or withdrawn intermittently and subjected to a de-waxing or de-oiling treatment and then returned to the reactor. The cleansing of the catalyst is accomplished by heating to volatilize and remove oily and/or waxy material therefrom.

The removal of oil or wax from the catalyst can be accomplished by means of solvents or by vaporization. As previously indicated, my present invention relates to the removal of oily and waxy material from the catalyst by means of volatilization.

In carrying my invention into practical effect I propose to conduct the synthesis reaction and the oil or wax removal step in two or more stages. For purposes of illustrating my invention, a two-stage operation will be described.

Referring to the drawing I and IA represent a pair of vertical cylindrical reactors of the type commonly used in fluid catalyst systems. In general these reactors are cylindrical in their main portion but have conical bases and crown pieces and also carry a screen or grid located in the bottom thereof, through which the gasiform material passes as it enters the mass of fluidized catalyst. In the drawing the synthesis gas comprising a mixture of CO and $H_2$ in which the ratio of $H_2$ to CO is about two to one by volume, enters the system via line 2, passes through a heater 5 (if a heater is necessary) and then enters at the bottom of reactor I as shown in the drawing. These reactors have been described in prior disclosures and since the form and structure of the said reactors do not go to the heart of my present invention, it will not be necessary to describe them herein. The reactors I and IA are operated so that the main bulk of catalyst is withdrawn from the bottom through lines 3 and 3A from reactors I and IA respectively, and the hot catalyst is passed through coolers 4 and 4A respectively to remove a portion of the exothermic heat which is released in the said reactors. It is within the purview of my invention to dispose the cooling means within the reactor and in this case there would be no outside circulation as shown through coolers 4 and 4A. The fluidized state of the catalyst in the reactors I and IA is maintained, as is known, by controlling the net upward velocity of the gases or vapors in the range of from ½ to 5 ft. per second, preferably from 1½ to 3 ft. per second where the catalyst has a particle size of from 100 to 400 mesh. This flow rate results in the formation of a dense phase suspension having an upper level which level depends on the amount of catalyst left in the reactor. Above this dense phase upper level, the concentration of catalyst in the gases drops sharply so that the reaction gases withdrawn from the reactors through lines 6 and 6A contains only a relatively small quantity of catalyst. It is preferable to pass the gases in 6 and 6A through dust collectors such as centrifugal separators or electrical precipitators to remove the last traces of catalyst. The reaction products are condensed in coolers 7 and 7A and collected in receiving drums 10 and 10A.

It will be noted that the catalyst withdrawn from reactor I after passing through a cooler 4 is in part passed through a line 12, carrying a flow-control valve 13, into line 2 where it is mixed with the incoming gas formed into a suspension in line 2 and then carried back to the reactor. However, another portion of the catalyst passes via line 14 after it is admixed with gaseous material from line 15 and formed into a suspension, through a heater 20 and thence via line 21 into reactor IA. It should be pointed out that the uncondensed vapors in line 15 may contain quantities of carbon dioxide, and since this is a diluent it may be advisable to pass the cooled vapors through a scrubber S containing an aqueous solution of, say, sodium hydroxide or some other known material in which carbon dioxide is soluble for the purpose of removing the said carbon dioxide.

It is also pointed out that in a large installation heater 20 may not be required and therefore its use is optional depending upon conditions. Reactor IA operates as both a synthesis reactor on the unconverted CO and $H_2$ coming from reactor I and as a stripper for the wax and oil deposited on the catalyst. The gas leaving I is cooled to condense out the heavy constituents so that it can revaporize heavy components from the catalyst removed from reactor I and is aided in effecting this vaporization by operating reactor IA at a lower pressure and a higher temperature than used in I. The stripping of oily and waxy material from the catalyst in reactor IA is further aided by withdrawing a portion of the gaseous material from 10A through line 22, pumping it by pump 23 through a heater 24 and thence discharging it by line 25 to reactor IA. The material in line 25 carries in suspension catalyst recovered from cooler 4A via line 26 carrying a flow-control valve 27 which permits the withdrawal of catalyst from the cooler 4A and is discharged into the gasiform material in line 22 where it is formed into a suspension. Another portion of the catalyst cooled in 4A is withdrawn through a pipe 30 carrying flow-control valve 31 and delivered into said gas line 2 where it is formed into a suspension and carried into reactor I in the manner indicated in the drawing.

Referring again to receiving drum 10A into which the product from reactor IA is first delivered, it will be noted from the drawing that a pipe 40 projects from the top of the receiving drum 10A, passes through a cooler 41 and by this conduit means gasiform material in 10A may be withdrawn from the latter through 40, cooled and condensed in 41 and collected in a second receiving drum 10B which is maintained at a temperature of about 100° F. The water and product formed in the process is withdrawn from 10, 10A and 10B. Water is withdrawn through lines 49, 49A and 49B and the crude product from lines 50, 50A and 50B.

As to operating conditions, I prefer to operate in the following way. The catalysts mentioned in the tabular view below contain the following ingredients. The Co—Mg catalyst contains cobalt, the active component, magnesium as a promoter and kieselguhr as the carrier. For example, the catalyst may contain 32% cobalt, 63% kieselguhr and 5% magnesium by weight. The iron catalyst is over 45% iron with possibly 5% of alkali metals, copper or aluminum.

*Reactor I*

| | Catalyst | Broad Range | | Preferred Range | |
|---|---|---|---|---|---|
| | | Co-Mg | Fe | Co-Mg | Fe |
| 1 | Temperature, °F | 375–450 | 450–700 | 390–425 | 550–650 |
| 2 | Pressure, p. s. i. g | 10–150 | 50–500 | 15–105 | 100–300 |
| 3 | Fresh Feed Rate Vol. $CO+H_2$/ Vol. Cat/hr | 50–500 | 50–1000 | 100–300 | 200–700 |
| 4 | Conversion of CO, per cent | 50–90 | 50–90 | 60–75 | 60–75 |
| 5 | Ratio $H_2/CO$ | 2/1 | 1 to 1.5 / 1 | 2/1 | 1.1 to 1.25 / 1 |

*Reactor II*

| | Catalyst | Broad range | | Preferred Range | |
|---|---|---|---|---|---|
| | | Co-Mg | Fe | Co-Mg | Fe |
| 1 | Temperature, °F., Higher than Reactor I | 5–100 | 5–250 | 10–50 | 10–100 |
| 2 | Pressure p. s. i. g. lower than Reactor I | 10–150 | 50–500 | 15–105 | 100–300 |
| 3 | Feed Rate | Gas from Reactor I: Within space velocity limits indicated for Reactor I. | | | |
| 4 | Total Conversion CO, per cent | 65–100 | 65–100 | 75–95 | 75–95 |
| 5 | Recycle Gas Vol./ Vol. Feed Gas | 0.5–10 | 0.5–10 | 1–5 | 1–5 |

Another important aspect of my invention is that the reactor IA is of smaller volume than I and preferably has a size of about one-third that of the larger reactor. While I have described in detail a two-stage operation for synthesizing hydrocarbons from CO and $H_2O$, it is to be distinctly understood that I may use three or more stages to accomplish this result.

To recapitulate briefly, my present invention is bottomed on the proposition that hydrocarbons may be synthesized from CO and $H_2O$ continuously using the so-called fluid catalyst type of operation, which I have hereinbefore described. In this type of operation materials which are liquid under operating conditions interfere with and impede operation of the system because they interfere with the fluidization of the catalyst. Therefore, in order to correct this insufficiency I provide a process wherein the catalyst is continuously or at relatively short intervals withdrawn from the reaction zone and stripped of liquid or waxy material by volatilizing off the said oily or waxy material and returning the catalyst in substantially dry condition to the reaction zone where it is better adapted to be fluidized.

Having explained the nature and purpose of my invention and the utility thereof, it is my purpose to claim the features disclosed herein, except those excluded by the terms of the abandoned claims.

What I claim is:

1. The method of operating a hydrocarbon synthesis plant continuously, which comprises providing at least two reaction zones containing fluidized masses of powdered catalyst, charging a gaseous mixture containing CO and hydrogen to the said reaction zones, permitting the CO and hydrogen to contact the catalyst in the reaction zones at reaction temperature for a sufficient period of time to effect a conversion of CO with hydrogen into hydrocarbons and maintaining the catalyst in the first of said zones substantially free of oily and waxy material by continuously withdrawing catalyst from said first reaction zone and charging it to a second one of said reaction zones, subjecting the catalyst in said second reaction zone to a higher temperature than that prevailing in the first zone whereby oily and waxy materials are removed by volatilization, said conversion taking place simultaneously in said second zone, discharging volatile hydrocarbons into said second zone for the purpose of augmenting the volatilization taking place, and thereafter withdrawing the cleansed catalyst and returning it to the first-named zone.

2. The method set forth in claim 1 in which the temperature in said second zone is from 10° to 100° F. higher than in said first zone.

3. The method set forth in claim 1 in which the pressure in said second zone is lower than in said first zone.

4. The method set forth in claim 1 in which the catalyst is essentially metallic iron.

5. The method of operating a hydrocarbon synthesis plant continuously, which comprises providing at least two reaction zones containing fluidized masses of powdered catalyst, charging a gaseous mixture containing CO and hydrogen to the said reaction zones, permitting the CO and hydrogen to contact the catalyst in the reaction zones at reaction temperature for a sufficient period of time to effect a conversion of CO with hydrogen into hydrocarbons and maintaining the catalyst in the first of said zones substantially free of oily and waxy material by continuously withdrawing catalyst from said first reaction zone and charging it to a second one of said reaction zones, subjecting the catalyst in said second reaction zone to a higher temperature than that prevailing in the first zone whereby oily and waxy materials are removed by volatilization said conversion taking place simultaneously in said second zone, withdrawing reaction product from said first zone, cooling said withdrawn reaction product to form a liquid product and a gaseous product, separating the two products, discharging the gaseous product with catalyst into said second reaction zone, and thereafter withdrawing cleansed catalyst from said second reaction zone and returning it to said first reaction zone.

6. The method of operating a hydrocarbon synthesis plant continuously, which comprises providing at least two reaction zones containing fluidized masses of powdered catalyst, charging a gaseous mixture containing CO and hydrogen to the said reaction zones, permitting the CO and hydrogen to contact the catalyst in the reaction zones at reaction temperature for a sufficient period of time to effect a conversion of CO with hydrogen into hydrocarbons and maintaining the catalyst in the first of said zones substantially free of oily and waxy material by continuously withdrawing catalyst from said first reaction zone and charging it to a second one of said reaction zones, subjecting the catalyst in said second reaction zone to a higher temperature than that prevailing in the first zone whereby oily and waxy materials are removed by volatilization, said conversion taking place simultaneously in said second zone, withdrawing reaction product from said first reaction zone, cooling product to condense a liquid product, separating uncondensed vapors from said liquid product, scrubbing said vapors to remove carbon dioxide, conducting said scrubbed vapors to said second reaction zone, and thereafter withdrawing cleansed catalyst from said second reaction zone and returning it to said first reaction zone.

WALTER G. SCHARMANN.

REFERENCES CITED

The following references are of record in the file of this patent:

UNITED STATES PATENTS

| Number | Name | Date |
|---|---|---|
| 2,244,196 | Herbert | June 3, 1941 |
| 2,251,554 | Sabel | Aug. 5, 1941 |
| 2,347,682 | Gunness | May 2, 1944 |
| 2,360,787 | Murphree | Oct. 17, 1944 |